(12) United States Patent
Lacoss-Arnold et al.

(10) Patent No.: US 9,996,830 B2
(45) Date of Patent: Jun. 12, 2018

(54) SPLIT MESSAGE INITIATED PAYMENT SYSTEM, METHOD AND APPARATUS

(71) Applicant: MASTERCARD INTERNATIONAL INCORPORATED, Purchase, NY (US)

(72) Inventors: Jason Jay Lacoss-Arnold, Saint Louis, MO (US); Joan L. Rohlfing, Maryland Heights, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days. days.

(21) Appl. No.: 14/253,089

(22) Filed: Apr. 15, 2014

(65) Prior Publication Data

US 2015/0294291 A1 Oct. 15, 2015

(51) Int. Cl.
*G06Q 20/20* (2012.01)
*G06Q 20/14* (2012.01)

(52) U.S. Cl.
CPC ........... *G06Q 20/209* (2013.01); *G06Q 20/20* (2013.01)

(58) Field of Classification Search
USPC .......................................................... 705/24
See application file for complete search history.

(56) References Cited

U.S. PATENT DOCUMENTS

2002/0077978 A1\* 6/2002 O'Leary ................ G06Q 20/04
705/40
2013/0030996 A1\* 1/2013 MacKouse ........... G06Q 20/102
705/40

\* cited by examiner

*Primary Examiner* — Garcia Ade
(74) *Attorney, Agent, or Firm* — Hovey Williams LLP

(57) ABSTRACT

A system, method, and computer-readable storage medium configured to split a payment card transaction into separate channels with a merchant bill message and cardholder payment message.

18 Claims, 8 Drawing Sheets

SPLIT MESSAGE INITIATED PAYMENT SYSTEM, METHOD AND APPARATUS

BACKGROUND

Field of the Disclosure

Aspects of the disclosure relate in general to security and fraud prevention in financial services. Aspects include an apparatus, system, method and computer-readable storage medium to split a payment card transaction into separate channels with a merchant bill message and a cardholder payment message.

Description of the Related Art

In modern times, payment cards are rapidly replacing cash to facilitate payments or other forms of financial transactions. A payment card is a card that can be used by a cardholder and accepted by a vendor or merchant to make a payment for a purchase or in payment of some other obligation. An example of a payment card includes a stored-value card (such as a transit card or gift card), credit card, debit card, automated teller machine card, or charge card. The payment card is generally used to pay an exact amount.

Payment cards are affiliated with payment networks, which are operational networks that enable monetary exchange between parties.

Typically during a purchase transaction, payment card information is captured at a merchant point-of-sale (POS) device, and transmitted over a single channel to a payment card issuer financial institution for transaction authorization via an acquiring financial institution and the payment network. If the issuer deems the payment cardholder credit worthy and that the transaction is unlikely to be fraudulent, the issuer notifies the payment network that the transaction is authorized. This authorization is sent to the merchant POS device via the acquirer, and the transaction is concluded.

SUMMARY

Embodiments include an apparatus, method and computer-readable medium configured to split a payment card transaction into separate channels with a merchant bill message and cardholder payment message.

In a point-of-sale terminal method, a processor generates a bill for a purchase transaction. The processor generates a purchase transaction code, the purchase transaction code based at least in part on an identifier for the merchant or point-of-sale terminal, transaction amount, and date/time of the transaction. A display or printer visually presents a representation of the purchase transaction code on a display or printer. A network interface transmits a merchant bill message to a payment network. The merchant bill message containing the purchase transaction code and not containing customer payment information. The network interface receives a transaction approval or decline message.

In a customer payment device method, a customer payment device receives a purchase transaction code from a point-of-sale terminal. The purchase transaction code includes a representation of a bill for a purchase transaction, an identifier for the merchant or the point-of-sale terminal, transaction amount, and date/time of the purchase transaction. A processor extracts the bill for the purchase transaction from the purchase transaction code. A display prompts a customer to approve the bill for the purchase transaction. The processor authenticates a customer approval of the bill for the purchase transaction. Customer payment information is retrieved from a database. The network interface transmits a cardholder payment message to an issuer. The cardholder payment message including the purchase transaction code and the customer payment information.

In a payment network method, a network interface receives a merchant bill message from a merchant. The merchant bill message contains a purchase transaction code and does not containing customer payment information. The network interface receives a cardholder payment message from a cardholder payment device. The cardholder payment message includes the purchase transaction code and customer payment information. A processor matches the merchant bill message with the cardholder payment message based at least in part on the purchase transaction code. The processor combines the merchant bill message and the cardholder payment message into a single transaction message. The network interface transmits the single transaction message to an issuer for approval.

DETAILED DESCRIPTION

One aspect of the disclosure includes the realization that hacking into merchant computers has resulted in the theft of millions of customer payment card account numbers.

Yet another aspect of the disclosure is the realization the damage caused by hacking may be obviated by preventing merchant computers from having customer payment card account numbers in the first place.

Another aspect of the disclosure is the understanding that by splitting a payment transaction into two separate messages that are transmitted via separate channels would allow a merchant to be paid without providing the merchant the customer's payment card information. In such an aspect, the two separate messages may be a merchant bill message (which does not contain payment information) and a cardholder payment message.

Embodiments of the present disclosure include a system, apparatus, method, and computer-readable storage medium configured to split a payment card transaction into separate channels with a merchant bill message and cardholder payment message.

It is understood by those familiar with the art that the term "payment card" includes credit cards, debit cards, charge cards, and Automated Teller Machine (ATM) cards. In addition to payment cards, it is understood by those familiar with the art that the embodiments described herein apply equally to payments via mobile devices (such as augmented reality devices, key fobs, mobile phones, tablet computers, and the like), electronic wallets, virtual payment cards, cloud-based payment devices, cashless payment devices/methods, or computers.

In the following description, the terms "customer" and "cardholder" may be used interchangeably. In most of the embodiments described below, customers will be paying with payment cards. However some in embodiments, customers may also electronically pay for a purchase transactions using checking accounts.

Figure 1:
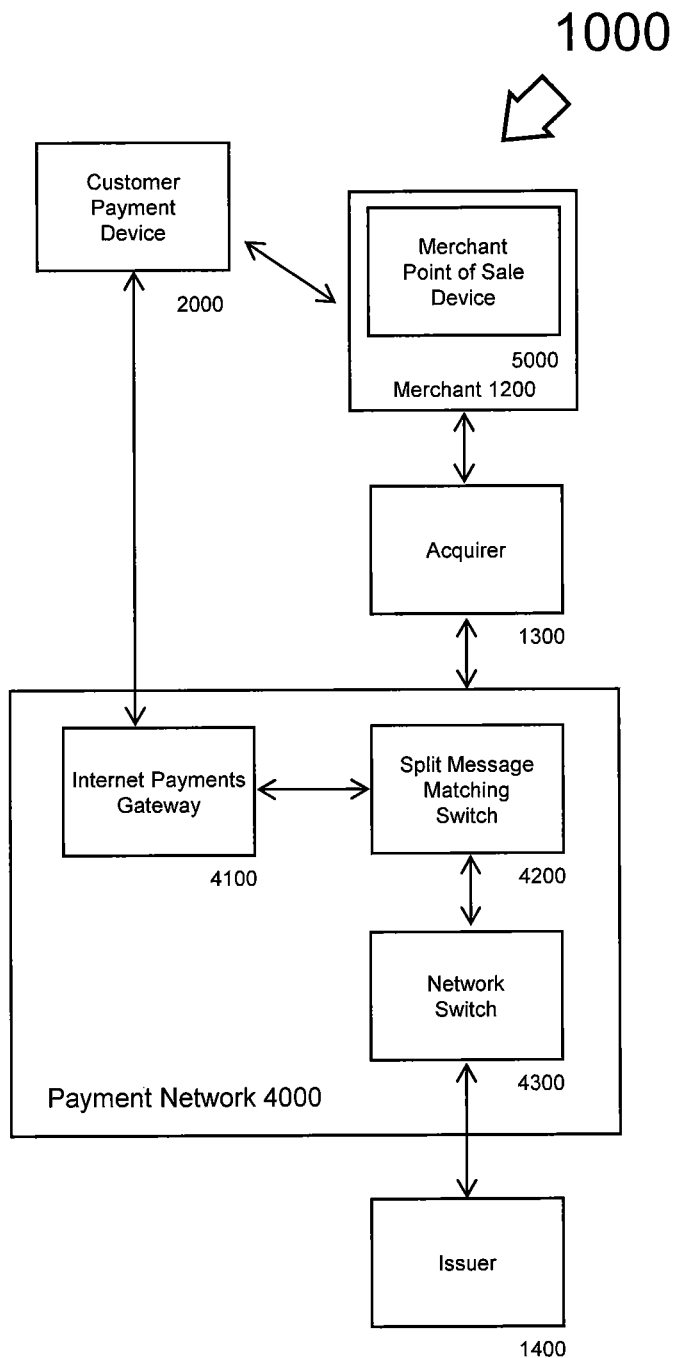
FIG. 1 illustrates an embodiment of a system to split a payment card transaction into separate channels with a merchant bill message and cardholder payment message.

Embodiments will now be disclosed with reference to an exemplary embodiment of system 1000 of FIG. 1 configured to split a payment card transaction into separate channels with a merchant bill message and cardholder payment message, constructed and operative in accordance with an embodiment of the present disclosure. In such a payment transaction, splitting the transaction into separate billing and payment messages allow the payment transaction to occur without presenting the payment information to the merchant.

In system 1000, a financial institution called the "issuer" 1400 issues a payment card to a cardholder, who uses the customer payment device 2000 to tender payment for a service or good at a merchant 1200. The merchant 1200 has a merchant point-of-sale device 5000 which administers the sale on behalf of the merchant.

The merchant 1200 is affiliated with a financial institution. This financial institution is usually called the "acquiring bank," "merchant bank" or "acquirer" 1300. At the point of payment, merchant point-of-sale device 5000 does not capture any payment card information, such as a Primary Account Number (PAN) or any other payment information. Instead, merchant point-of-sale device 5000 sends a merchant bill message to an acquirer 1300. The acquirer 1300 in turn forwards the purchase transaction details to a split message matching switch 4200 at a payment network 4000.

Payment network 4000 processes payment transactions. For sake of example only, the present disclosure will describe a payment network-based system, such as the payment system using the MasterCard® interchange, Cirrus® network, or Maestro®. The MasterCard interchange is a proprietary communications standard promulgated by MasterCard International Incorporated for the exchange of financial transaction data between financial institutions that are customers of MasterCard International Incorporated. Cirrus is a worldwide interbank network operated by MasterCard International Incorporated linking debit and payment cards to a network of ATMs throughout the world. Maestro is a multi-national debit card service owned by MasterCard International Incorporated.

Simultaneously, the merchant point-of-sale device 5000 presents the customer a payment transaction code that encapsulates the merchant bill message or details of the transaction. In some embodiments, the payment transaction code is an encoded representation of a merchant bill message or details of the transaction. The payment transaction code is described in greater detail below.

In some embodiments, the customer manually enters the payment transaction code into a customer payment device 2000; in other embodiments, the customer payment device 2000 scans the code optically or otherwise receives the code from the merchant point-of-sale device 5000.

When the payment transaction code is entered into the customer payment device 2000, the customer is presented options of how to electronically pay for the transaction. For the sake of example, the customer decides to pay with virtual payment card information stored within the customer payment device 2000.

The customer authorizes payment of the transaction using the customer payment device 2000, which electronically routes the payment information, along with the associated payment transaction code, to an internet payments gateway 4100 at the payment network 4000. Using the payment transaction code transmitted in each message, the split message matching switch 4200 matches the merchant bill message with the cardholder payment message, combining both parts of the transaction into a single message transmitted by a network switch 4300 to the issuer 1400 financial institution.

The issuer 1400 then either authorizes or declines the transaction, and the result is reported to the merchant 1200.

Figure 2:
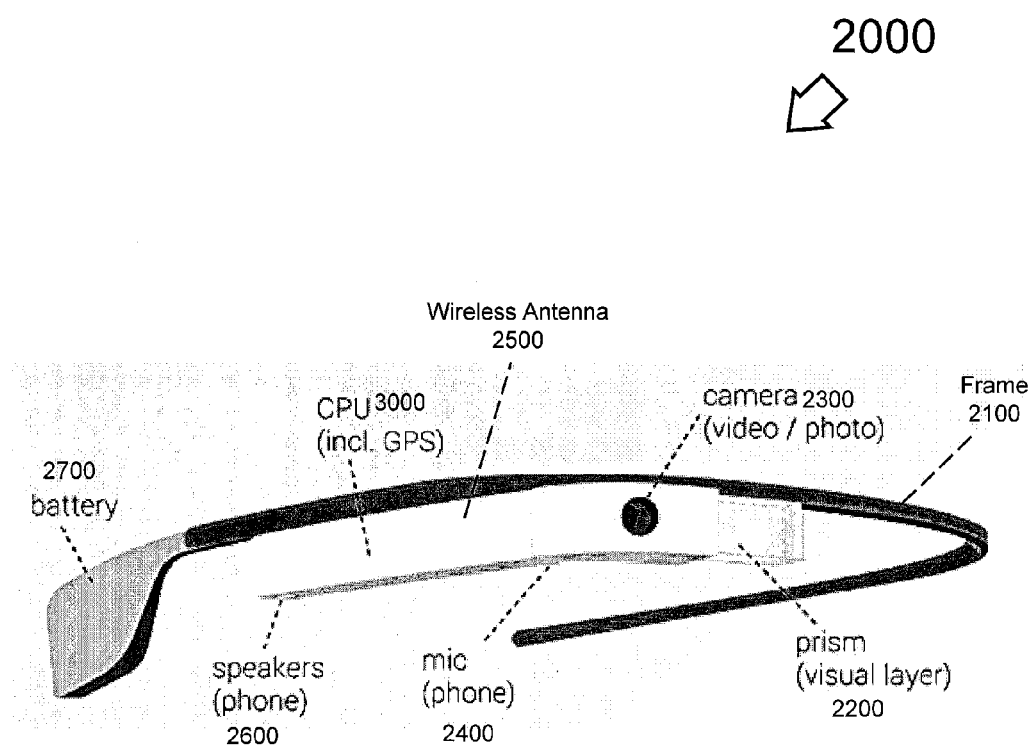
FIG. 2 illustrates a diagram of a customer payment apparatus to split a payment card transaction into separate channels with a cardholder payment message.

Embodiments will now be disclosed with reference to an exemplary embodiment of customer payment device 2000 of FIG. 2, configured to split a payment card transaction into separate channels with a cardholder payment message, constructed and operative in accordance with an embodiment of the present disclosure. For the sake of example, this disclosure will describe an augmented reality headset 2000. It is understood by those familiar with the art that a customer payment device may exist in a variety of different embodiments, including but not limited to: tablet computers, heads up displays, mobile phones, and augmented reality headsets.

As shown in FIG. 2, the augmented reality headset 2000 includes a frame 2100. The frame may be made of a composite material, plastic, graphite, or other material known in the art. In some embodiments, frame 2100 includes touch sensors to provide touch pad functionality. Frame 2100 may house additional components, including a display (prism, visual layer) 2200, a camera 2300, microphone 2400, speakers 2600, battery 2700, processor 3000, storage medium 2800 and wireless antenna 2500. These components are described more fully with FIG. 3.

Figure 3:
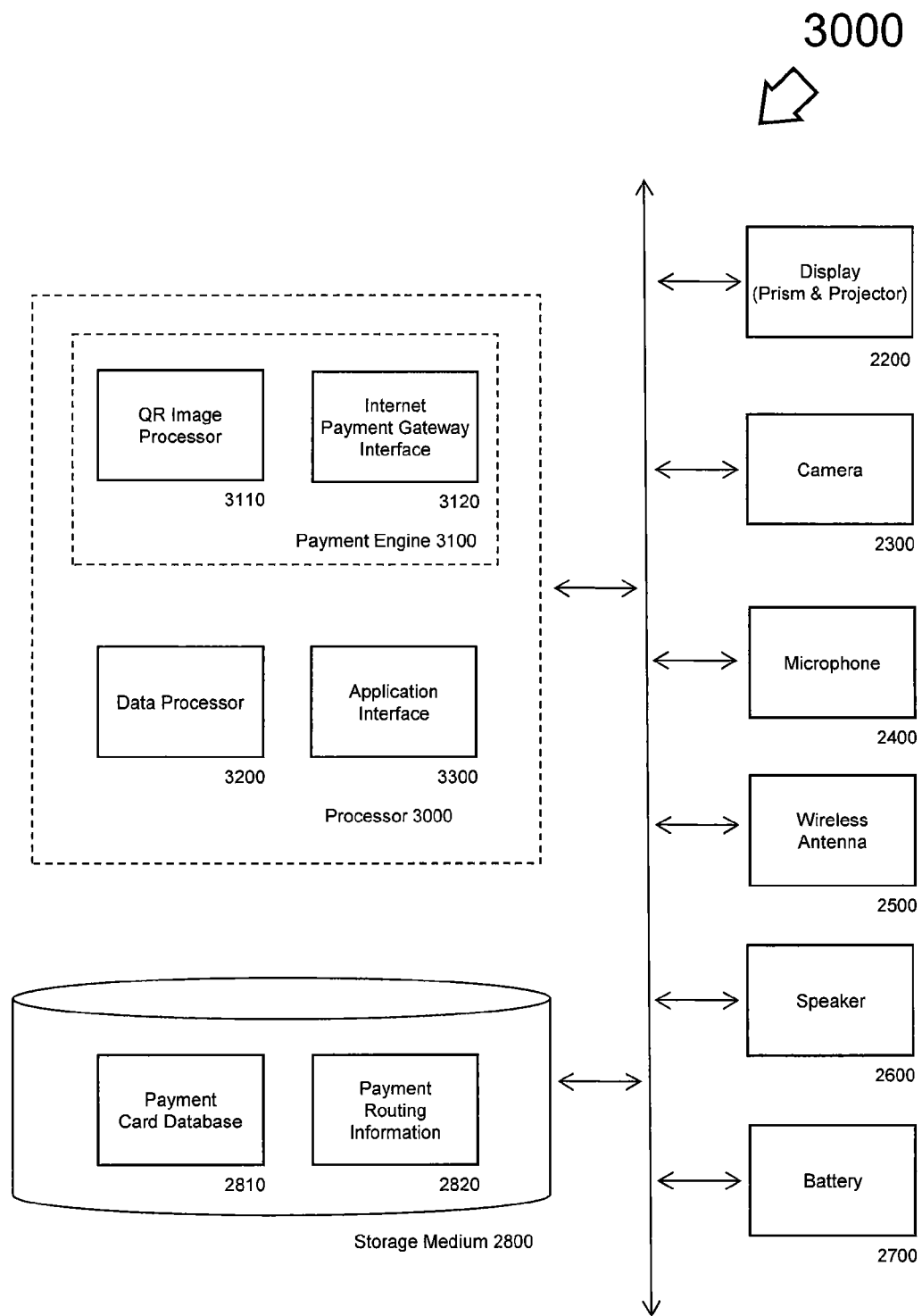
FIG. 3 illustrates a block diagram of the customer payment apparatus to split a payment card transaction into separate channels with a cardholder payment message.

FIG. 3 illustrates a functional block diagram of the augmented reality headset 2000 configured to transmit a cardholder payment message, constructed and operative in accordance with an embodiment of the present disclosure. As mentioned in FIG. 2, augmented reality headset 2000 has a frame 2100, which may house additional components.

Display 2200 provides visual information to the users. In some embodiments, the display is a piece of prism glass that allows users to see their environment, while providing a visual overlay on the environment.

Camera 2300 may be any image capture device known in the art. In some embodiments, camera 2300 may take pictures and record video which may be stored on a non-transitory computer-readable storage medium 2800 or downloaded via wireless antenna 2500.

Microphone 2400 may be any audio receiving device known in the art, including a bone conduction transducer.

Speakers 2600 may be any audio reproduction device known in the art.

Battery 2700 provides a power source to augmented reality headset 2000. In some embodiments, battery 2700 is a rechargeable lithium-ion battery.

Storage medium 2800 may be a conventional read/write memory such as a flash memory, transistor-based memory, or other computer-readable memory device as is known in the art for storing and retrieving data.

In addition, as shown in FIG. 3, storage medium 2800 may also contain a payment card database 2810, and payment routing information 2820. When present, payment card database 2810 is a data structure or database that contains a list of user payment card information, including the Primary Account Number (PAN) of the payment card. In some embodiments, payment card database 2810 may contain checking account information. Payment routing information 2820 is a database that contains routing information for sending messages to the payment network 4000.

It is understood by those familiar with the art that one or more of these databases 2810-2820 may be combined in a myriad of combinations. The function of these structures may best be understood with respect to the flowcharts of FIG. 7, as described below.

Processor 3000 may be any central processing unit, microprocessor, micro-controller, computational device or circuit known in the art. It is understood that processor 3000 may temporarily store instructions and data in Random Access Memory (not shown).

As shown in FIG. 3, processor 3000 is functionally comprised of a payment engine 3100, a data processor 3200, and application interface 3300.

A payment engine 3100 enables the functionality for the consumer to make payments with payment card information stored in payment card database 2810. Payment engine 3100 may further comprise: QR image processor 3110, and internet payment gateway interface 3120.

A QR image processor 3110 is the processing element configured to decode a matrix barcode (also referred to as a two-dimensional bar code, or "QR code") received from camera 2300. In other embodiments, QR image processor 3110 may decode any type of machine readable representation of the payment transaction.

Internet payment gateway interface 3120 is a program or service that routes messages to an internet payment gateway 4100 based on payment routing information 2820. In some embodiments, internet payment gateway interface 3120 periodically updates payment routing information 2820 based on information received from issuer 1400 or payment network 4000.

Data processor 3200 enables processor 3000 to interface with storage medium 2800, wireless antenna 2500, camera 2300, battery 2700, display 2200, speaker 2600, microphone 2400, computer memory or any other component not on the processor 3000. The data processor 3200 enables processor 3000 to locate data on, read data from, and write data to these components.

Application interface 3300 may be any user interface known in the art to facilitate communication with the user of the augmented reality headset 2000; as such, application interface 3300 may communicate with the user via display 2200, any touch sensor or button, speaker 2600, or microphone 2400.

These structures may be implemented as hardware, firmware, or software encoded on a computer readable medium, such as storage medium 2800. Further details of these components are described with their relation to method embodiments below.

Wireless antenna 2500 may be any radio frequency (RF) transceiver, such as a radio frequency (RF) transceiver, as is known in the art for interfacing, communicating or transferring data across a telecommunications network, computer network, Bluetooth, WiFi, near-field communications, contactless point-of-sale network, and the like. Examples of such a network include a digital cellular telephony network. Antenna 2500 allows augmented reality headset 2000 to communicate via the digital cellular telephony network to an issuer 1400, a payment network 4000, or other entities.

Figure 4:
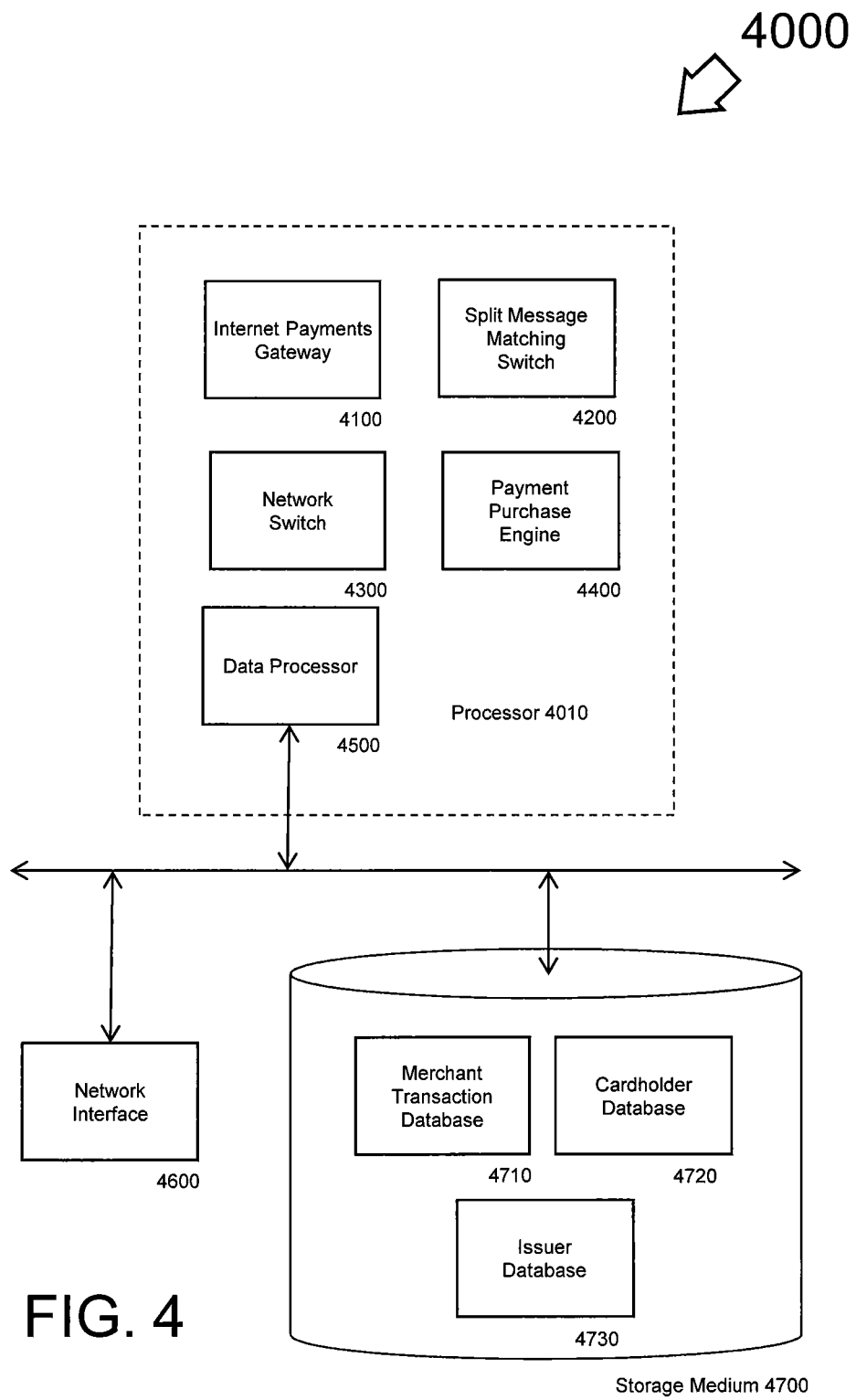
FIG. 4 illustrates a block diagram of a payment network apparatus to receive a payment card transaction from separate channels with a merchant bill message and a cardholder payment message.

Embodiments will now be disclosed with reference to a block diagram of an exemplary payment network server of FIG. 4, configured to receive a payment card transaction from separate channels with a merchant bill message and a cardholder payment message, merging them into a single payment transaction message, constructed and operative in accordance with an embodiment of the present disclosure.

Payment server may run a multi-tasking operating system (OS) and include at least one processor or central processing unit (CPU) 4010, a non-transitory computer-readable storage media 4700, and a network interface 4600.

Processor 4010 may be any central processing unit, microprocessor, micro-controller, computational device or circuit known in the art. It is understood that processor 4010 may temporarily store data and instructions in a Random Access Memory (RAM) (not shown), as is known in the art.

As shown in FIG. 4, processor 4010 is functionally comprised of an internet payments gateway 4100, split message matching switch 4200, network switch 4300, payment purchase engine 4400, and a data processor 4500.

Data processor 4500 interfaces with storage media 4700 and network interface 4600. The data processor 4500 enables processor 4010 to locate data on, read data from, and writes data to, these components.

Internet payments gateway 4100 is the structure that receives a cardholder payment message from the customer payment device 2000, analyzes and extracts a payment transaction code from the cardholder payment message.

Split message matching switch 4200 matches payment transaction codes stored within a cardholder payment message received from the customer and a merchant bill message received from the merchant and combines them into a single payment transaction to be processed by the payment purchase engine 4400.

Payment purchase engine 4400 is the structure that performs payment and purchase transactions, and may do so in conjunction with a single payment transaction message created by split message matching switch 4200.

Network switch 4300 is the structure that determines the issuer 1400 associated with a payment card used within a payment transaction. Network switch 4300 may access and use information stored within an issuer database 4730 in making the issuer 1400 determination.

Figure 8:
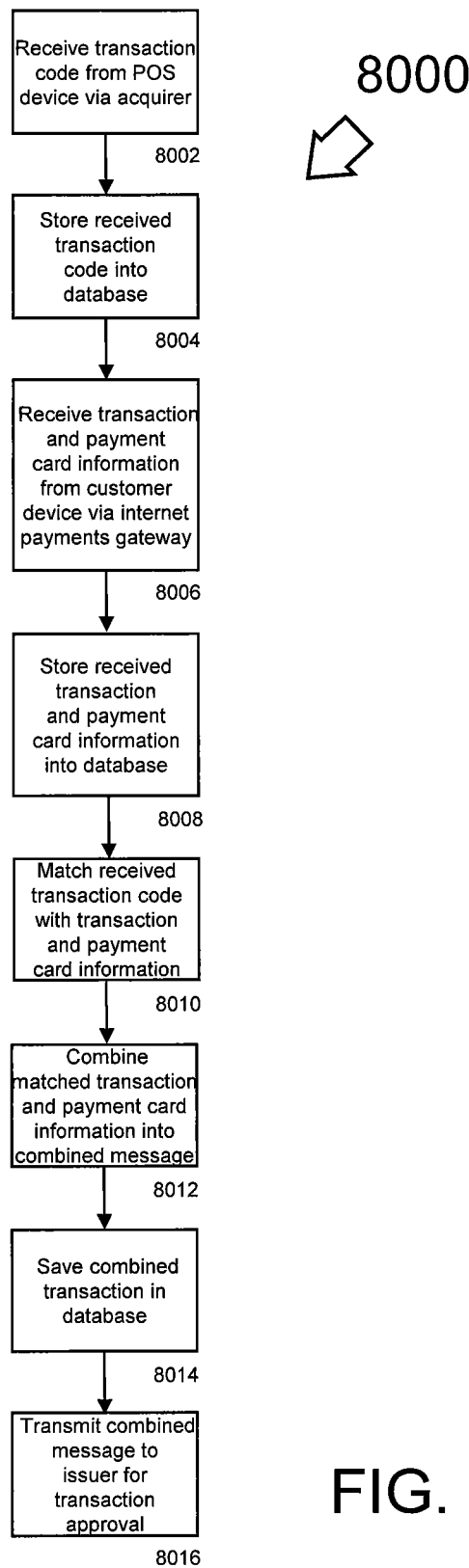
FIG. 8 is a flowchart of a payment network method to combine a merchant bill message and a cardholder payment message received from separate channels into a payment card transaction message.

The functionality of all these structures is elaborated in greater detail in FIG. 8. These structures may be implemented as hardware, firmware, or software encoded on a computer readable medium, such as storage media 4700. Further details of these components are described with their relation to method embodiments below.

Non-transitory computer-readable storage media 4700 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. In some embodiments, computer-readable storage media 4700 may be remotely located from processor 4010, and be connected to processor 4010 via a network such as a local area network (LAN), a wide area network (WAN), or the Internet.

In addition, as shown in FIG. 4, storage media 4700 may also contain a merchant transaction database 4710, a cardholder database 4720, and an issuer database 4730. Merchant transaction database 4710 stores transaction data received from a merchant 1200 or acquirer 1300, including a merchant bill message. Cardholder database 4720 stores cardholder information, and may include a cardholder payment message received from a customer payment device 2000. Issuer database 4730 stores information that may assist in sorting a payment transaction to the appropriate issuer 1400. It is understood by those familiar with the art that one or more of these databases 4710-4730 may be combined in a myriad of combinations.

Network interface 4600 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 4600 allows payment server to communicate with merchant 1200 and issuer 1400.

Figure 5:
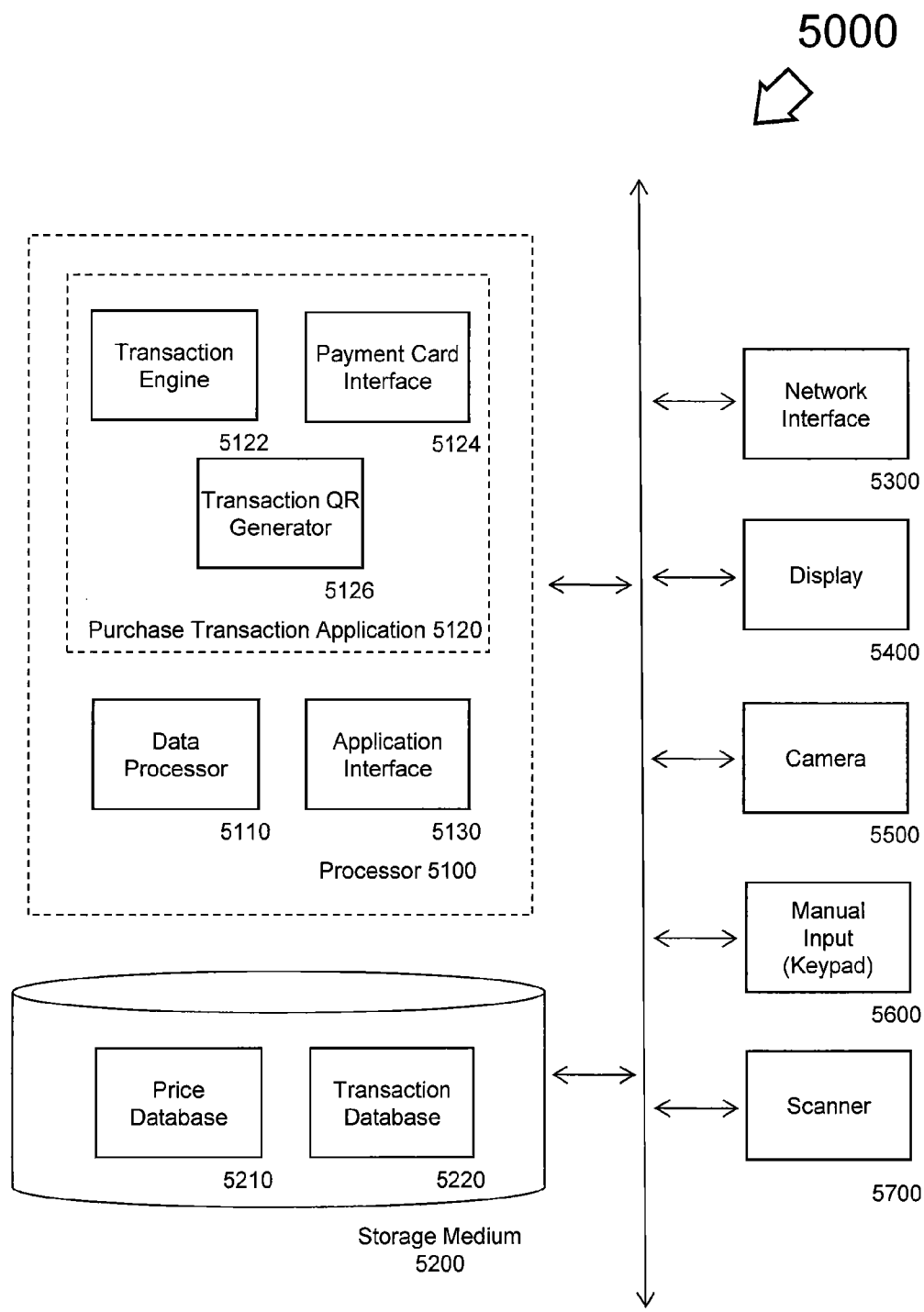
FIG. 5 illustrates a block diagram of a point-of-sale terminal apparatus to split a payment card transaction into separate channels with a merchant bill message.

FIG. 5 illustrates a block diagram of a point-of-sale terminal apparatus to split a payment card transaction into separate channels with a merchant bill message, constructed and operative in accordance with an embodiment of the present disclosure. Deployed at merchant 1200, point of sale terminal 5000 may be used to process a payment card transaction. Unlike a conventional point-of-sale terminal, as part of the payment card transaction, merchant point-of-sale device 5000 does not capture any payment card information, such as a Primary Account Number (PAN) or any other payment information. Instead, merchant point-of-sale device 5000 generates a payment transaction code, such as a QR code or the like, to represent the payment transaction. The payment transaction code is embedded in a merchant bill message sent to an acquirer 1300, and embedded in a code sent to a customer payment device 2000. This way, the customer payment information may be sent in a separate communications channel to a payment network 4000, and payment card information is never received by a merchant 1200.

Point-of-sale terminal 5000 may be a cash register, stand-alone kiosk, tablet computer, mobile phone, personal digital assistant (PDA), mobile device or any other computing device known in the art capable of processing and transmitting a bill message to a payment network 2000.

Point-of-sale terminal 5000 may run a multi-tasking operating system (OS) and include at least one processor or central processing unit (CPU) 5100, a non-transitory computer-readable storage medium 5200, a network interface 5300, a display 5400, and a camera 5500. Point-of-sale terminal 5000 may further include manual input 5600, and an optical scanner 5700. In some alternate embodiments, the point-of-sale device 5000 may include a printer (or be connected to a printer) to print receipts.

Processor 5100 may be any central processing unit, microprocessor, micro-controller, computational device or circuit known in the art. It is understood that processor 5100 may temporarily store instructions and data in Random Access Memory (not shown).

As shown in FIG. 5, processor 5100 is functionally comprised of a data processor 5110, a purchase transaction application 5120, and application interface 5130.

Data processor 5110 enables processor 5100 to interface with storage medium 5200, network interface 5300, display 5400, camera 5500, manual input 5600, scanner 5700, computer memory or any other component not on the processor 5100. The data processor 5110 enables processor 5100 to locate data on, read data from, and write data to these components.

Application interface 5130 may be any graphical user interface known in the art to facilitate communication with the user of the point-of-sale terminal 5000; as such, application interface 5130 may communicate with the user via display 5400, camera 5500, manual input 5600, or scanner 5700.

Purchase transaction application 5120 enables the functionality to facilitate a financial transaction. Purchase transaction application 5120 may further comprise: transaction engine 5122, payment card interface 5124, and transaction QR generator 5126.

A transaction engine 5122 is the structure that enables purchase transaction application 5120 to obtain the price of a good or service from price database 5210, and tally the items and services purchased or returned.

Payment card interface 5124 is the structure that enables the transaction engine 5122 to process payment cards in a financial transaction.

Transaction QR generator 5126 is the structure that generates a payment transaction code to represent the payment transaction. In some embodiments, the payment transaction code is a unique identifier representing the payment transaction, such as a machine readable code, for example a QR code. The payment transaction code may be based on an identifier for the merchant and/or point-of-sale terminal 5000, transaction type, transaction amount, and/or the date and time of the transaction. In other embodiments, the payment transaction code is a hash representing the transaction. Transaction QR generator 5126 provides the payment transaction code to the payment card transaction engine 5122, which embeds the code in a merchant bill message sent to an acquirer 1300. Additionally, transaction QR generator 5126 displays the code to be scanned by customer payment device 2000. In some alternate embodiments with a printer, the point-of-sale device 5000 may print a QR code that contains the payment transaction code for scanning by the customer payment device 2000. In yet other embodiments, a transaction code generator 5126 may generate and present a payment transaction code that is not turned into a QR code.

These structures may be implemented as hardware, firmware, or software encoded on a computer readable medium, such as storage medium 5200. Further details of these components are described with their relation to method embodiments below.

Network interface 5300 may be any data port as is known in the art for interfacing, communicating or transferring data across a computer network. Network interface 5300 allows point-of-sale terminal 5000 to communicate with an acquirer 1300, payment network 4000, or other entities.

Display 5400 may be any liquid crystal display (LCD) display, light emitting diode (LED) screen, touch-sensitive screen, or other monitor known in the art for visually displaying images and text to a user.

A camera 5500 may be any image capture device configured to capture a barcode, QR code, SKU code, or other optical representation of a product/service price. Scanner 5700 may be any optical scanner to capture barcode images, as is known in the art. In some embodiments, camera 5500 may also act as scanner 5700. It is understood that scanner 5700 and camera 5500 may include appropriate digital-to-analog and analog-to-digital conversion circuitry as appropriate.

Manual input 5600 may be buttons, a conventional keyboard, keypad, track pad, trackball, or other input device as is known in the art for the manual input of data. In some embodiments, manual input 5600 may be integrated into a touch-sensitive display 5400. In other embodiments, manual input 5600 may be a virtual keyboard.

Storage medium 5200 may be a conventional read/write memory such as a flash memory, memory stick, transistor-based memory, hard drive, magnetic storage device, or other computer-readable memory device as is known in the art for storing and retrieving data.

In addition, as shown in FIG. 5, storage medium 5200 may also contain a price database 5210 and transaction database 5220. A price database 5210 includes pricing records for products and services at merchant 1200. Transaction database 5220 includes records for all transactions that occur at point-of-sale terminal 5000. It is understood by those familiar with the art that these databases 5210-5220 may be combined in a myriad of combinations.

Figure 6:
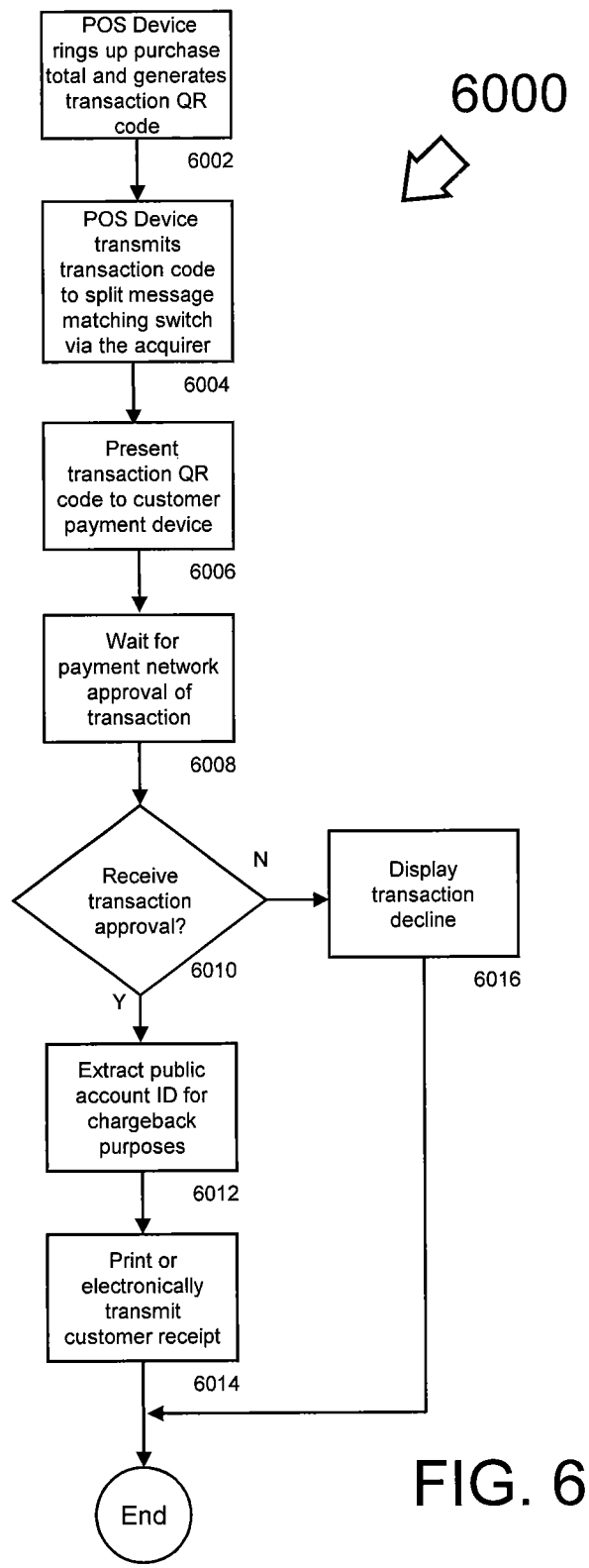
FIG. 6 is a flowchart of a point-of-sale terminal method to split a payment card transaction into separate channels with a merchant bill message.
Figure 7:
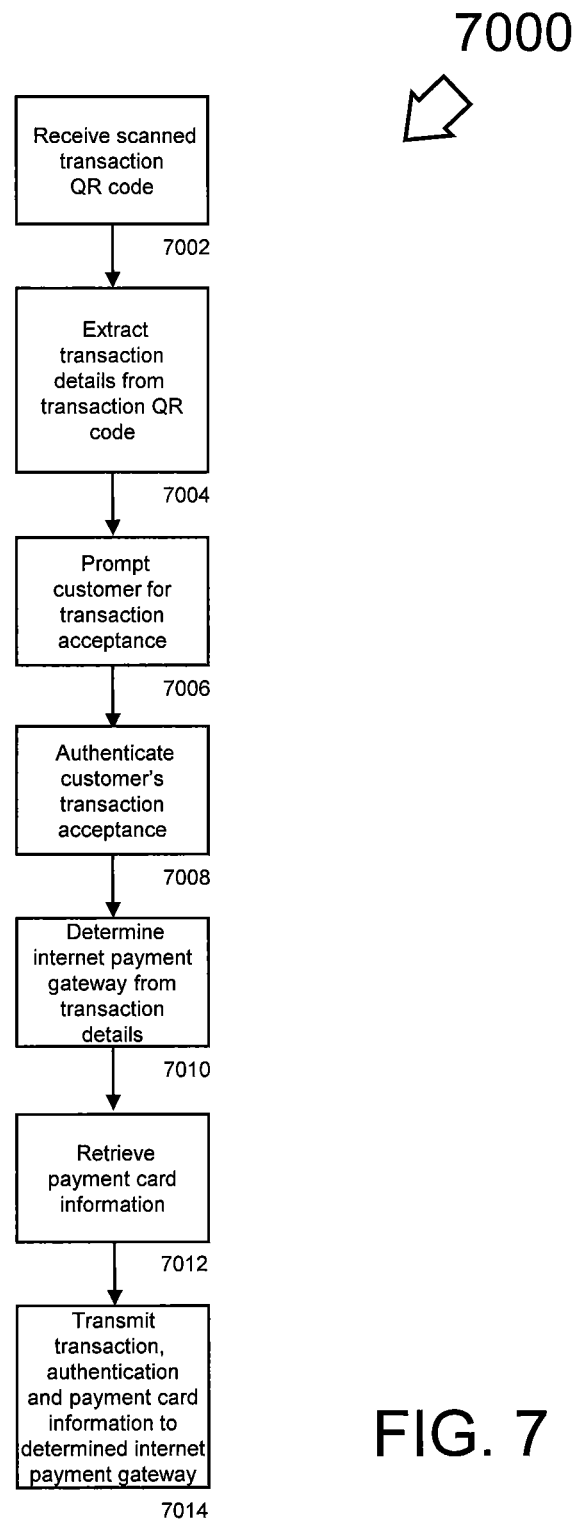
FIG. 7 is a flowchart of a customer payment method to make a payment in a system with a cardholder payment message.

We now turn our attention to the method or process embodiments of the present disclosure described in the flow diagrams of FIGS. 6-8. It is understood by those known in the art that instructions for such method embodiments may be stored on their respective computer-readable memory and executed by their respective processors. It is understood by those skilled in the art that other equivalent implementations can exist without departing from the spirit or claims of the disclosure.

FIG. 6 is a flowchart of a point-of-sale terminal method 6000 to split a payment card transaction into separate channels with a merchant bill message, constructed and operative in accordance with an embodiment of the present disclosure.

Initially, at block 6002, point-of-sale terminal 5000 rings up the purchase total. Transaction QR generator 5126 generates a payment transaction code to represent the payment transaction. As mentioned above, in some embodiments, the payment transaction code is a unique identifier representing the payment transaction. The payment transaction code may be based on an identifier for the merchant and/or point-of-sale terminal 5000, transaction type, transaction amount, and/or the date and time of the transaction. In other embodiments, the payment transaction code is a hash representing the transaction. In some embodiments, payment transaction code may further include the location or locale of where the transaction is taking place.

At block 6004, transaction QR generator 5126 provides the payment transaction code to the payment card transaction engine 5122, which embeds the code in a merchant bill message. Transaction engine 5122 transmits the payment transaction code to an acquirer 1300 or payment network 4000 via the network interface 5300. In some embodiments, the payment transaction code may be encrypted during transmission.

Additionally, at block 6006, transaction QR generator 5126 presents the payment transaction code as a QR code to be scanned by customer payment device 2000. In some alternate embodiments with a printer, the point-of-sale device 5000 may print a QR code that contains the payment transaction code for scanning by the customer payment device 2000. In yet other embodiments, a transaction code generator 5126 may generate and present a payment transaction code that is not turned into a QR code, allowing for wireless or manual entry of the code into the customer payment device 2000. Wireless embodiments may use Bluetooth or contactless communication between customer payment device 2000 and point-of-sale terminal 5000.

Point-of-sale terminal 5000 waits for a transaction approval or decline message, block 6010.

If the transaction decline is received, as determined at decision block 6010, the transaction decline message is presented on the display 5400, block 6016.

If the transaction approval message is received, as determined at decision block 6010, process 6000 continues at block 6012.

When the payment transaction is approved, at block 6012, a public account ID is extracted from the transaction approval message. The public account ID may be used for chargeback purposes if merchandise is returned or services are not rendered.

A receipt for the products/services is electronically transmitted or printed at block 6014, and process 6000 ends.

FIG. 7 is a flowchart of a customer payment method 7000 to make a payment in a system a payment card transaction where is split into a merchant bill message and cardholder payment message, constructed and operative in accordance with an embodiment of the present disclosure.

At block 7002, customer payment device 2000 receives a payment transaction code from a point-of-sale terminal 5000. The customer payment device 2000 may receive a scanned transaction QR code, for example. In other embodiments, the payment transaction code may be received wirelessly or by manual entry of the code into the customer payment device 2000. As mentioned above, wireless embodiments may use Bluetooth, contactless or any other wireless communication between customer payment device 2000 and point-of-sale terminal 5000.

The transaction details are extracted from the payment transaction code, block 7004. The payment transaction code includes: an identifier for the merchant and/or point-of-sale terminal 5000, transaction type, transaction amount, and date/time of the transaction. In some embodiments, payment transaction code may further include the location or locale of where the transaction is taking place.

Using the display 2200, the customer is prompted to accept the transaction, block 7006.

The customer acceptance of the transaction is authenticated at block 7008. Customer acceptance may be authenticated in a myriad of ways, including, but not limited to: oral (voice-print) acceptance, password, finger print, or any other authentication method known in the art. In some embodiments, customer acceptance may also be indicated by choice of payment method by the customer. In such an embodiment, the customer may choose from payment methods stored within the customer payment device 2000, including a payment card or a checking account.

Based on the transaction details, payment method used and/or payment routing information 2820, the internet payment gateway interface 3120 matches the appropriate internet payments gateway 4100, block 7010.

The payment card (or checking account) details are retrieved from the payment card database 2810, block 7012.

A cardholder payment message is transmitted to the appropriate internet payments gateway 4100, block 7014. The cardholder payment message includes the identifier for the merchant and/or point-of-sale terminal 5000, transaction type, transaction amount, and date/time of the transaction, and payment method information (i.e., payment card Primary Account Number, or checking account number). In most embodiments, the cardholder payment message is encrypted; the encryption method be any encryption method known in the art.

FIG. 8 is a flowchart of a payment network method to combine a merchant bill message and a cardholder payment message from separate channels into a payment card transaction message, constructed and operative in accordance with an embodiment of the present disclosure.

Because the merchant bill message and cardholder payment message are received from separate channels, the messages may be received at any order—that one message is received before the other. The order of the message receipt does not affect the transaction. Once both messages are received, the contents of both messages are matched to the same transaction and combined into a single payment transaction request message to be transmitted to an issuer 1400 for transaction approval.

At block 8002, split message matching switch 4200 receives a merchant bill message that originated from a point-of-sale terminal 5000. The merchant bill message may have been routed by merchant 1200 through an acquirer 1300. The payment transaction code and other transaction details are stored into merchant transaction database 4710, block 8004.

The internet payments gateway 4100 receives a cardholder payment message originating from the customer payment device 2000, block 8006. The payment transaction code and other payment method details are stored into cardholder database 4720, block 8008.

The merchant bill message and cardholder payment message are matched together at block 8010. The two messages may be matched as they have the same payment transaction code. In alternate embodiments, the two messages may be matched as they have identical transaction details.

Once the two messages are matched, the transaction and payment method information is combined into a single payment approval message, block 8012. The payment approval message is saved in the customer database 4710, block 8014, and transmitted to the appropriate issuer 1400 for approval, block 8016. It is understood that in the case of a payment card, the appropriate issuer 1400 is the issuer 1400 of payment card; in the case of a checking account, the checking transaction is sent to the financial institution that holds the customer checking account.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A point-of-sale terminal method comprising:
generating a bill for a purchase transaction with a processor of a point-of-sale terminal;
generating, with the processor of the point-of-sale terminal, a purchase transaction code based at least in part on the bill for the purchase transaction, an identifier for the merchant or point-of-sale terminal, a transaction amount, and a date/time of the transaction;
visually presenting a representation of the purchase transaction code on a display or printer of the point-of-sale terminal;
transmitting a merchant bill message to a payment network with a network interface of the point-of-sale terminal, the merchant bill message containing the purchase transaction code and not containing customer payment information;
receiving a transaction approval or decline message via the network interface of the point-of-sale terminal;
displaying, on the display of the point-of-sale terminal, a transaction approval or decline based on the transaction approval or decline message; and
printing a receipt, with the printer of the point-of-sale terminal, the receipt including the bill for the purchase transaction.

2. The point-of-sale terminal method of claim 1, further comprising: extracting a public account identifier from the transaction approval message.

3. The point-of-sale terminal method of claim 2, wherein the receipt further includes the public account identifier.

4. The point-of-sale terminal method of claim 3, wherein the representation of the purchase transaction code is a matrix (QR) bar code.

5. The point-of-sale terminal method of claim 2, further comprising:
electronically mailing a receipt, with the network interface of the point-of-sale terminal, the receipt including the bill for the purchase transaction.

6. A customer payment device method comprising:
receiving a purchase transaction code from a point-of-sale terminal, the purchase transaction code including a representation of a bill for a purchase transaction, an identifier for the merchant or the point-of-sale terminal, transaction amount, and date/time of the purchase transaction;
extracting, with a processor, the bill for the purchase transaction from the purchase transaction code;
prompting a customer to approve the bill for the purchase transaction with a display;
authenticating, with the processor, a customer approval of the bill for the purchase transaction;
retrieving customer payment information from a database;
transmitting a cardholder payment message to a payment network or an issuer with a network interface, the cardholder payment message including the purchase transaction code and the customer payment information;
displaying, on a display of the point-of-sale terminal, a transaction approval or decline based on a transaction approval or decline message; and
printing a receipt, with a printer of the point-of-sale terminal, the receipt including the bill for the purchase transaction.

7. The customer payment device method of claim 6, wherein the purchase transaction code is received from the point-of-sale terminal via customer input.

8. The customer payment device method of claim 6, wherein the purchase transaction code is received wirelessly from the point-of-sale terminal via the network interface.

9. The customer payment device method of claim 6, wherein the purchase transaction code is received from the point-of-sale terminal encoded as a matrix (QR) barcode via an optical scanner.

10. The customer payment device method of claim 6, further comprising:
prompting the customer to select the customer payment information from a plurality of customer payment information.

11. The customer payment device method of claim 10, wherein the customer payment information is a virtual payment card.

12. The customer payment device method of claim 10, wherein the customer payment information is a checking account.

13. A payment network method comprising:
- receiving a merchant bill message from a point-of-sale terminal, via a network interface, the merchant bill message containing a purchase transaction code and not containing customer payment information;
- receiving a cardholder payment message from a cardholder payment device with the network interface, the cardholder payment message including the purchase transaction code and customer payment information;
- matching, with a processor, the merchant bill message with the cardholder payment message based at least in part on the purchase transaction code;
- combining, with the processor, the merchant bill message and the cardholder payment message into a single transaction message;
- transmitting, with the network interface, the single transaction message to an issuer for approval;
- displaying, on a display of the point-of-sale terminal, a transaction approval or decline based on a transaction approval or decline message; and
- printing a receipt, with a printer of the point-of-sale terminal, the receipt including a bill for the purchase transaction.

14. The payment network method of claim 13, wherein the purchase transaction code is further based at least in part on the bill for the purchase transaction, an identifier for the merchant or point-of-sale terminal, transaction amount, and date/time of the transaction.

15. The payment network method of claim 14, further comprising: storing the single transaction message in a database.

16. The payment network method of claim 15, further comprising: receiving the transaction approval or decline message from the issuer.

17. The payment network method of claim 16, wherein the customer payment information is a virtual payment card.

18. The payment network method of claim 16, wherein the customer payment information is a checking account.

* * * * *